(12) United States Patent
Tomar (10) Patent No.: US 12,488,357 B2
(45) Date of Patent: Dec. 2, 2025

(54) SYSTEM AND METHOD FOR PREVENTING COUNTERFEITING OF PRODUCTS USING PACKAGING CODES AND BLOCKCHAIN TECHNOLOGY

(71) Applicant: Cognizant Technology Solutions India Pvt. Ltd., Chennai (IN)

(72) Inventor: Nishkarsh Tomar, Bareilly (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 138 days.

(21) Appl. No.: 18/437,672

(22) Filed: Feb. 9, 2024

(65) Prior Publication Data

US 2025/0139646 A1 May 1, 2025

(30) Foreign Application Priority Data

Oct. 26, 2023 (IN) .............................. 202341072790

(51) Int. Cl.
| | | |
|---|---|---|
| G06Q 30/018 | (2023.01) | |
| H04L 9/00 | (2022.01) | |
| H04L 9/32 | (2006.01) | |

(52) U.S. Cl.
CPC ....... *G06Q 30/0185* (2013.01); *H04L 9/3236* (2013.01); *H04L 9/50* (2022.05)

(58) Field of Classification Search
CPC .................................................. G06Q 30/0185
See application file for complete search history.

(56) References Cited

U.S. PATENT DOCUMENTS

| | | | |
|---|---|---|---|
| 9,722,790 B2 | 8/2017 | Ebrahimi | |
| 10,341,123 B2 | 7/2019 | Ebrahimi et al. | |
| 11,323,272 B2 | 5/2022 | Ebrahimi et al. | |
| 2016/0098723 A1 | 4/2016 | Feeney | |
| 2021/0334808 A1 | 10/2021 | Ebrahimi | |
| 2022/0014390 A1 | 1/2022 | Li et al. | |

FOREIGN PATENT DOCUMENTS

IT 1404493 B1 * 11/2013 ......... G06Q 10/0833

OTHER PUBLICATIONS

Lou, Shuting, et al. "QR code anti-counterfeiting technique with lattice-based cryptography." International Conference on Cyber Security, Artificial Intelligence, and Digital Economy (CSAIDE 2023). vol. 12718. SPIE, 2023. (Year: 2023).*

\* cited by examiner

*Primary Examiner* — Emmett K. Walsh
(74) *Attorney, Agent, or Firm* — TROUTMAN PEPPER LOCKE LLP (57) ABSTRACT

System and method for prevention of counterfeiting of products using combination of packaging codes and blockchain technology is provided. Hash of a first product code is generated by encrypting scanned product data associated with a product received. Second product code is generated by encrypting first product code for combining with distinct first product code Quick Response (QR) part values. Hash of a third product code is generated by combining hash of first product code and hash of second product code. Hash of third product code is divided into a hash of a first sub-code and a hash of a second sub-code. Lastly, a comparison of a scanned third product code placed on the product is performed with requested user ID, generated hash of first product code, second product code and hash of third product code to ascertain a match therebetween for preventing counterfeiting of the product.

30 Claims, 7 Drawing Sheets

SYSTEM AND METHOD FOR PREVENTING COUNTERFEITING OF PRODUCTS USING PACKAGING CODES AND BLOCKCHAIN TECHNOLOGY

CROSS-REFERENCE TO RELATED APPLICATIONS

This application claims priority to Indian Patent Application number 202341072790, filed Oct. 26, 2023, which is hereby incorporated by reference in its entirety.

FIELD

The present invention relates generally to the field of prevention of counterfeiting of products. More particularly, the present invention relates to a system and a method for effectively preventing counterfeiting of products using a combination of packaging codes and blockchain technology.

BACKGROUND

Counterfeiting of products is a global problem that affects various industries and consumers. Counterfeiting of products may cause economic losses, damage to brand reputation, exploitation of child labor, increase in environmental pollution, stalling of innovation and fair economic opportunities, adverse effects on government expenses and tax revenues, adverse effect on employment opportunities and poses health and safety risks. The factors that contribute to counterfeiting may include, but are not limited to, lack of awareness and enforcement of rules and regulations, high demand and low supply of products, price sensitivity and low income, technology advancement and use of online platforms for purchasing of products. Typically for preventing counterfeiting some of the measures that are employed include educating consumers and stakeholders, implementing anti-counterfeiting measures and standards, collaborating with authorities and industry associations, and leveraging technology and innovation to stop counterfeiting.

Typically, it has been observed that existing techniques used in prevention of counterfeiting of products are associated with one or more issues. The one or more issues are that product codes are not verified at each and every stage of the supply chain, the existing techniques are not secure, not immutable, and prone to reverse engineering. Further, the existing counterfeiting techniques do not provide transparency to the stakeholders with respect to the product journey in the supply chain. Also, the existing techniques do not provide cost-effective solutions for tracing the product in the supply chain, and do not effectively address challenges faced by the product and packaging in the supply chain. Furthermore, the existing counterfeiting prevention techniques associated with the product can be easily tampered with. Yet further, serialization codes used for preventing counterfeiting are varied having multiple formats, are complex and expensive. Also, existing techniques with multilevel authentication are prone to tampering (e.g., iris identity can be stolen, heart beats can be traced, face identity can be scanning, etc.). Further, physical servers may be hacked, and user credentials and identity data can be taken. Yet further, physical objects can be tampered with, product packaging is generally not secured, and safety standards may be duplicated.

In light of the aforementioned drawbacks, there is a need for a system and a method which provides for effective prevention of counterfeiting of products using a combination of packaging codes and blockchain technology. There is a need for a system and a method which provides for verifying product codes at each and every stage of the supply chain. Further, there is a need for a system and a method which provides for security and transparency in determining product journey in a supply chain. Furthermore, there is a need for a system and a method which provides for efficient tracing of products in the supply chain. Also, there is a need for a system and a method which provides for tamper free product prevention from counterfeiting. Yet further, there is a need for a system and a method which provides for a simplified format and a cost-effective counterfeiting prevention technique.

SUMMARY

In various embodiments of the present invention, a system for effective prevention of counterfeiting of products using a combination of packaging codes and blockchain technology is provided. The system comprises a memory storing program instructions, a processor executing instructions stored in a memory and a product code generation engine executed by the processor. The product code generation engine is configured to generate a hash of a first product code by encrypting scanned product data associated with a product received from an input/output unit. The first product code is a cryptographic hash conversion of the product data. The product code generation engine is configured to generate a second product code by encrypting the first product code for combining with one or more distinct Quick Response (QR) part values. The product code generation engine is configured to generate a hash of a third product code by combining the hash of the first product code and the second product code. The hash of the third product code is divided into a hash of a first sub-code and a hash of a second sub-code. Lastly, the product code generation engine is configured to perform a comparison of a scanned third product code placed on the product with a requested user ID, the generated hash of the first product code, the second product code and the hash of the third product code to ascertain a match therebetween for preventing counterfeiting of the product.

In various embodiments of the present invention, a method for effective prevention of counterfeiting of products using a combination of packaging codes and blockchain technology is provided. The method is implemented by a processor executing instructions stored in a memory. The method comprises generating a hash of a first product code by encrypting scanned product data associated with a product received. The first product code is a cryptographic hash conversion of the product data. The method comprises generating a second product code by encrypting the first product code for combining with one or more distinct Quick Response (QR) part values. The method comprises generating a hash of the third product code by combining the hash of the first product code and the second product code. The hash of the third product code is divided for providing a hash of a first sub-code and a hash of a second sub-code. Lastly, the method comprises performing a comparison of a scanned third product code placed on the product with a requested user ID, the generated hash of the first product code, the second product code and the hash of the third product code to ascertain a match therebetween for preventing counterfeiting of the product.

In various embodiments of the present invention, a computer program product is provided. The computer program product comprises a non-transitory computer-readable medium having computer program code stored thereon, the computer-readable program code comprising instructions that, when executed by a processor, causes the processor to generate a hash of a first product code by encrypting scanned product data associated with a product received from an input/output unit (110). The first product code is a cryptographic hash conversion of the product data. A second product code is generated by encrypting the first product code for combining with one or more distinct Quick Response (QR) part values. A hash of a third product code is generated by combining the hash of the first product code and the second product code. The hash of the third product code is divided into a hash of a first sub-code and a hash of a second sub-code. Lastly, a comparison of a scanned third product code placed on the product is performed with a requested user ID, the generated hash of the first product code, the second product code and the hash of the third product code to ascertain a match therebetween for preventing counterfeiting of the product.

BRIEF DESCRIPTION OF THE ACCOMPANYING DRAWINGS

The present invention is described by way of embodiments illustrated in the accompanying drawings wherein.

DETAILED DESCRIPTION

The present invention discloses a system and a method which provides for effectively preventing counterfeiting of products using a combination of packaging codes and blockchain technology. The present invention discloses a system and a method which provides for verifying product codes at each and every stage of the supply chain. The present invention discloses a system and a method which provides for security and transparency in determining the product journey in a supply chain. The present invention discloses a system and a method which provides for efficient tracing of the product in the supply chain. Furthermore, the present invention discloses a system and a method which provides for tamper free product prevention from counterfeiting. Yet further, the present invention discloses a system and a method which provides for a simplified format and a cost-effective counterfeiting prevention technique.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

Examples of the present invention would now be discussed in context of embodiments as illustrated in the accompanying drawings.

Figure 1:
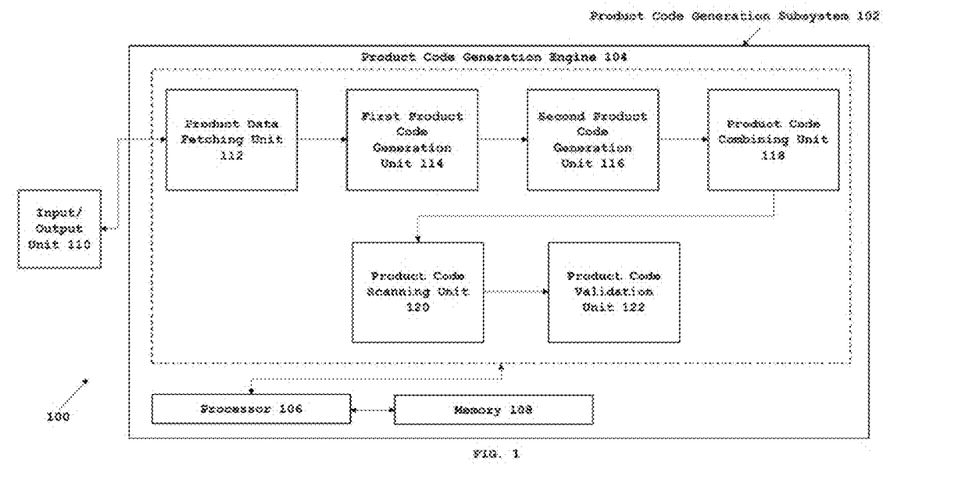
FIG. 1 is a detailed block diagram of a system for effectively preventing counterfeiting of products using a combination of packaging codes and blockchain technology, in accordance with an embodiment of the present invention.

FIG. 1 is a detailed block diagram of a system 100 for effectively preventing counterfeiting of products using a combination of packaging codes and blockchain technology, in accordance with various embodiments of the present invention. Referring to FIG. 1, in an embodiment of the present invention, the system 100 comprises a product code generation subsystem 102 and an input/output unit 110. In an exemplary embodiment of the present invention, the input/output unit 110 is a user device which may include electronic devices associated with a user such as, a smartphone, a computer and a laptop. The input/output unit 110 is connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. Examples of radio channel in telecommunications and computer networking may include, but are not limited to, a local area network (LAN), a metropolitan area network (MAN) and a wide area network (WAN).

In an embodiment of the present invention, the subsystem 102 is configured with a built-in mechanism for generating a unique product code. The unique product code is a hash code which is generated by employing blockchain technology. The unique product code is used in serializing physical packaging of products to prevent counterfeiting of the products. The subsystem 102 is configured to transform the serialization into an efficient product code format, using blockchain technology and packaging codes (e.g., Quick Response (QR) codes, maxi code, tags, etc.) for different types of product packaging relating to different industries. The subsystem 102 further generates a tamper free product code which is used to protect the product at every level viz. primary to tertiary levels of the supply chain and packaging.

In an embodiment of the present invention, the subsystem 102 comprises a product code generation engine 104 (engine 104), a processor 106, and a memory 108. In various embodiments of the present invention, the engine 104 has multiple units which work in conjunction with each other for generating a unique product code which is used in preventing counterfeiting of products. The various units of the engine 104 are operated via the processor 106 specifically programmed to execute instructions stored in the memory 108 for executing respective functionalities of the units of the engine 104 in accordance with various embodiments of the present invention.

In another embodiment of the present invention, the subsystem 102 may be implemented in a cloud computing architecture in which data, applications, services, and other resources are stored and delivered through shared datacenters. In an exemplary embodiment of the present invention, the functionalities of the subsystem 102 are delivered to a user as Software as a Service (SaaS) over a communication network.

In another embodiment of the present invention, the subsystem 102 may be implemented as a client-server architecture or in an application-based environment. In this embodiment of the present invention, a client terminal accesses a server hosting the subsystem 102 over a communication network. The client terminals may include but are not limited to a smart phone, a computer, a tablet, microcomputer or any other wired or wireless terminal. The server may be a centralized or a decentralized server.

In an embodiment of the present invention, the engine 104 comprises a product data fetching unit 112, a first product code generation unit 114, a second product code generation unit 116, a product code combining unit 118, a product code scanning unit 120, and a product code validation unit 122.

In operation, in an embodiment of the present invention, the product data fetching unit 112 is configured to receive product data from the input/output unit 110. The product data is provided by a user (e.g., a manufacturer) via the input/output device 110. In an example, the product data may include, but is not limited to, a product serial code, a product type, price of the product, stakeholders id, a unique id associated with the product, a product id, a Global Trade Item Number (GTIN) number, a labeler code, a product number, a package code, a serial number, a lot number, a National Drug Code (NDC) number (if the product is a drug) and an expiration date. Further, the product data may include, but is not limited to, address of the stakeholders, current status of product including, shipment status, timestamp, and manufacturing address of product. The product data fetching unit 112 is configured to update the product data, if a new product is added when a manufacturer registers and shares the new product data with other stakeholders. The product data fetching unit 112 is configured to update product status when the stakeholder scans and authenticates the product. Also, the product data includes data related to manufacturer, wholesaler, retailer, and pharmacy (if the product is a drug) account address and a contract address generated for the product. In an exemplary embodiment of the present invention, 'n' contract addresses are generated for 'n' stakeholders.

In an embodiment of the present invention, the first product code generation unit 114 is configured to scan the product data using a scanning technique such as a QR code scanner or any other scanning application. The product data includes product codes (e.g., product ID, unique ID, etc.) which have been recorded manually by the manufacturer or by employing any scanner. The first product code generation unit 114 is configured to encrypt the scanned product data for generating hash of a first product code by employing blockchain technology. The hash of the first product code is represented as a cover_ID_hash, which is a cryptographic hash conversion of the product data. The generated hash of the first product code is self-certified on a blockchain network. To self-certify the hash of the first product code on the blockchain network, the first product code generation unit 114 is configured to write the encrypted product data associated with the hash of the first product code on the blockchain network. The first product code generation unit 114 is further configured to embed a digital sign in the hash of the first product code and verify the hash of the first product code. The hash of the first product code is verified by the first product code generation unit 114 by firstly decrypting the encrypted product data associated with the hash of the first product code, securing the decrypted product data, and validating the product identity. In an exemplary embodiment of the present invention, the first product code generation unit 114 is configured to create a smart contract which includes a contract address and a first product code blockchain part value (referred to as a parent block). A smart contract is a transaction protocol that is intended to automatically execute, control or document events and actions according to the terms of a contract or an agreement. In another exemplary embodiment of the present invention, the first product code generation unit 114 is configured to create a chaincode. Chaincode is a program, written in at least one of Go® programming language, node.js, or Java® that implements a prescribed interface. Chaincode is executed in a secured Docker® container isolated from a peer process. Chaincode initializes and manages ledger state through transactions submitted by applications. Smart contracts refer to business logic that carries out transactions and access to data and chaincode refers to larger infrastructure of packages and other code that comprises the smart contract. In an exemplary embodiment of the present invention, one product type may include one contract address which is accessible throughout the supply chain by the stakeholders and multiple product types include multiple contract address which are accessible along the blockchain network. Further, a preference between smart contract and chaincode is defined based on respective requirement of blockchain networks such as Ethereum® and Hyperledger®.

In an embodiment of the present invention, the second product code generation unit 116 is configured to again encrypt the first product code for combining with one or more distinct Quick Response (QR) part values for generating a second product code. In an exemplary embodiment of the present invention, other code types, such as, numeric, alphanumeric, images, scanning codes, etc. may also be used instead of QR codes. In an embodiment of the present invention, the second product code generation unit 116 is configured to divide the QR part value by 'n' to generate 'n' QR codes part values and combine with the hash of the first product code. The QR part values are assigned to different stakeholders present in the supply chain based on previously captured stakeholders' data. As such, if 'n' stakeholders are present, then '64/n' unique QR codes are generated. The start and end characters for QR part values are represented as ((1, 64/n), (64/n+1, 65/2*n), . . . , n). In an exemplary embodiment of the present invention, the one or more QR part values may be represented as QR_A, QR_B, QR_C, and QR_D. For example, second product code=(hash of the first product code+QR part value 1)+(hash of the first product code+QR part value 2)+ . . . +(hash of the first product code+QR part value n). The second product code is an 8-to-64-bit code, which is updated and validated by the stakeholder.

Figure 2:
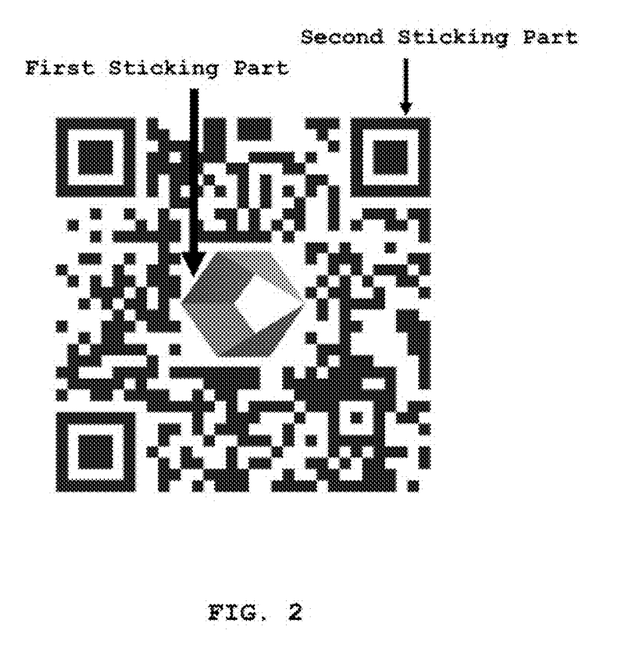
FIG. 2 illustrates a generated hash of the third product code providing a hash of the first sub-code represented as cover_ID_N hash code (numeric form) (which is stick or printed on a first sticking part) and a hash of the second sub-code represented as a cover_ID_A hash code (alphabetical form) (which is stick or printed on a second sticking part), in accordance with an embodiment of the present invention.
Figure 3:
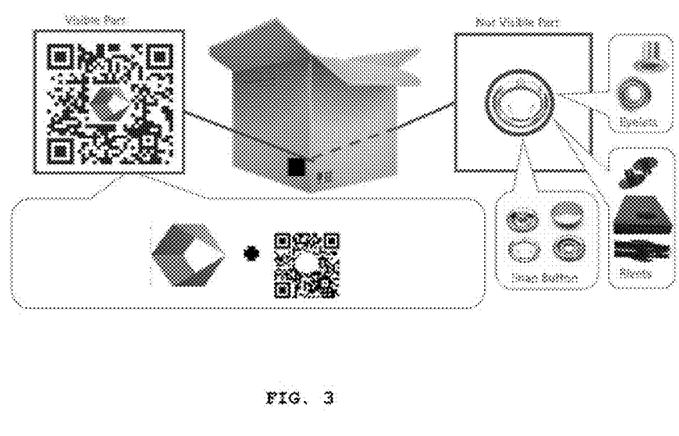
FIG. 3 illustrates placing of third product code on a product, in accordance with an embodiment of the present invention.

In an embodiment of the present invention, the product code combining unit 118 is configured to receive both the hash of the first product code and the second product code and combine the hash of the first product code and the second product code for generating a hash of the third product code referred to as a Cover_ID_AN (alphanumeric) hash. The hash of the third product code is a hash code of 256 bits associated with 'n' stakeholders and may be tagged to a user's ID (e.g., a Worldcoin® identity, digital lock keys, etc.). Start and end character for the hash of the third product code is associated with encrypted data and is represented as (hash of the first product code+second product code (1, 64/n))+(hash of the first product code+second product code (64/n+1, 65/2*n))+ . . . +(hash of the first product code+ second product code (n)). The hash of the third product code is further divided for providing a hash of a first sub-code represented as cover_ID_N hash code (numeric form), which is stuck or printed on a first sticking part and a hash of a second sub-code represented as a cover_ID_A hash code (alphabetical form), which is stuck or printed on a second sticking part on the product, as illustrated in FIG. 2. The numeric form of the hash value is selected by using one or more types of hash functions, such as, but not limited to, a division method, a mid-square method, a folding method, and a multiplication method. Further, the one or more alphabetical forms of the hash code are selected using a custom hash function that maps one or more keys to the alphabetical forms. The keys are used to divide the hash of the third product code into the hash of the first sub-code and the hash of the second sub-code. Further, the first sub-code and the second sub-code are printed on a scanning pattern for placing on the product, as illustrated in FIG. 3, which on combining together fulfills authentication requirement of the parent block in the blockchain network. In an embodiment of the present invention, as illustrated in FIG. 3, the third product code is placed on the outer covering or box of the product by using at least snap buttons, rivets, and eyelets, thereby providing a tamper free placement of the third product code, and serialization of packaging of the products. In an embodiment of the present invention, the third product code is printed on the product by encrypting user's address and location co-ordinates, thereby safeguarding the user's address. In another embodiment of the present invention, the third product code is encrypted with payment details for making payment transactions by the users and as such, payment transactions carried out may be tracked between different users. In yet another embodiment of the present invention, the third product code is encrypted with loyalty tags (e.g., reward points, coupons, etc.) which may be scanned for authenticating and releasing rewards. At every level of the supply chain, the scanning pattern provides product data when a scanning operation is performed. As such, no other stakeholder can breach or determine the third product code associated with another stakeholder. In the event, any person tries to tamper with the third product code, then the authentication breaks and a notification alerting regarding the tampering is sent to the parent block of the blockchain network.

In an embodiment of the present invention, the product code scanning unit 120 is configured to scan the generated hash of the third product code using a scanning technique. The scanning technique may include a scanning application, such as, Android® application, web application or Windows® application. Subsequent to scanning, a unique id assigned to the QR code associated with the hash of the third product code is fetched from a server (not shown) by using a QR code Application Programming Interface (API). The QR code API communicates with a Hyperledger® network API on the blockchain network and the product details (e.g., product name, product type, delivery destination, and delivery source) are fetched for displaying on a screen at the input/output unit 110. Subsequently, a request from blockchain network is redirected to the chaincode. A comparison of the scanned third product code placed on the product is performed with the requested user ID, the generated hash of the first product code, the second product code and the hash of the third product code to ascertain a match therebetween for preventing counterfeiting of the product. In the event, it is determined that the scanned third product code matches with a requested user ID, the hash of the first product code, the second product code and the hash of the third product code (which is a combination of the hash of the first product code, and the second product code), then the request is verified by a middleware API service. In the event, it is determined that the scanned third product code does not match with the requested user ID, the hash of the first product code, the second product code and the hash of the third product code, then the request is rejected by the middleware API service end.

In an embodiment of the present invention, the product code scanning unit 120, subsequent to successful verification of the request, is configured to send a notification to the input/output unit 110 for providing the product data related updates in the form of a message or an email. Similarly, the third product code is verified for all the products associated with all the stakeholders present in the supply chain. In an exemplary embodiment of the present invention, the product is considered to be legitimate, if the third product code is correctly verified, otherwise the product is considered to be illegitimate.

In an embodiment of the present invention, the product code validation unit 122 is configured to further scan the third product code placed on the product by using the scanning technique. A unique Universal Resource Locator (URL) link associated with a product status update request is rendered on the input/output unit 110, subsequent to scanning of the third product code, for updating status of the product. In an embodiment of the present invention, a Representational State Transfer Application Programming Interface (REST API) server (not shown) associated with the engine 104 is configured to receive the product status update request along with a stakeholder account address. The blockchain network is unlocked by using the stakeholder's account address and an associated password and a final verification process by using stakeholders consortium data. In the event, the blockchain network is unlocked successfully, then a third product code validation request is sent to the blockchain network by the product code validation unit 122. In an embodiment of the present invention, a check is carried out to determine whether a contract address associated with the third product code exists or not in the blockchain network. In the event, the contract address associated with the third product code exists in the blockchain network, then a contract address status is updated and validated by reading the actual contract address and fetching the stakeholder's current account address from the blockchain network. In the event, the contract address associated with the third product code does not exist in the blockchain network, then the product status update request is rejected and sent back to the stakeholder. In another embodiment of the present invention, if the contract address associated with the third product code exists in the blockchain network, then the validated status of the contract address associated with the third product code is communicated to a second product code contract validation process for a live update.

In an embodiment of the present invention, a three-step check is carried out by the product code validation unit 122 to validate status of the second product code contract. Firstly, a check is performed to determine whether a contract address associated with the second product code exists or not in the blockchain network. Secondly, a check is performed to determine whether the contract belongs to the same stakeholder or not. Thirdly, a check is carried out to determine whether the 16-bit second product code stored in the blockchain matches with the 16-bit actual contract address associated with the second product code. The contract address may vary from 64-bit to 256-bit. In the event, all the three checks are successful, then the status of the contract address associated with the second product code is updated and validated by the product code validation unit (122) on the blockchain network by reading the actual contract address and fetching the stakeholder's current account address from the blockchain network. Further, status from the validated second product code along with the actual contract address and stakeholder's current address is communicated to a new product contract for live update, and status of a new product is updated on the blockchain network based on the timestamp. Further, latest status of the new product is communicated to the stakeholders via the input/output unit 110. In the event, the first and second checks are unsuccessful, then the product status update request is rejected and sent back to the stakeholder. Further, in the event the third check is unsuccessful, then a breach is determined, and the status of the contract address associated with the second product code is updated and validated on the blockchain network by reading the actual contract address and fetching the stakeholder's current account address from the blockchain network.

Figure 4:
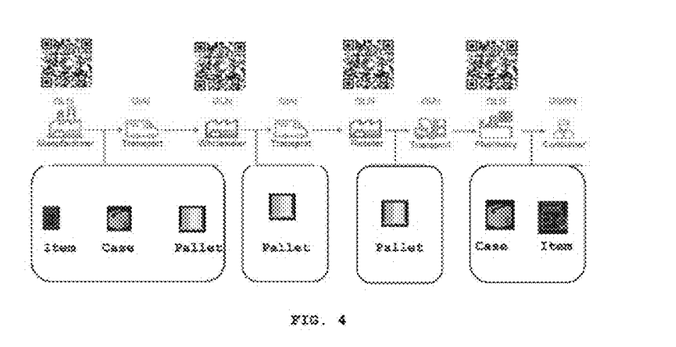
FIG. 4 illustrates an exemplary supply chain flow relating to a drug from manufacturer to pharmacy, in accordance with an embodiment of the present invention.

In an example, as illustrated in FIG. 4, a supply chain flow associated with movement of drug from manufacture to pharmacy is shown. As shown, scanning of the product is carried out through various scanning points that involve scanning the product data encrypted in the third product code associated with the drug at each end point in the supply chain. As the product passes each stakeholder, the third product code is scanned which fulfills the required authentication process. The respective stakeholder can easily detect if the product is tempered or counterfeited. At each end point of the supply chain, the tagged QR part of the third product code verifies the flow and the combination fulfillment at each end point and aids in authenticating the product.

Figure 5:
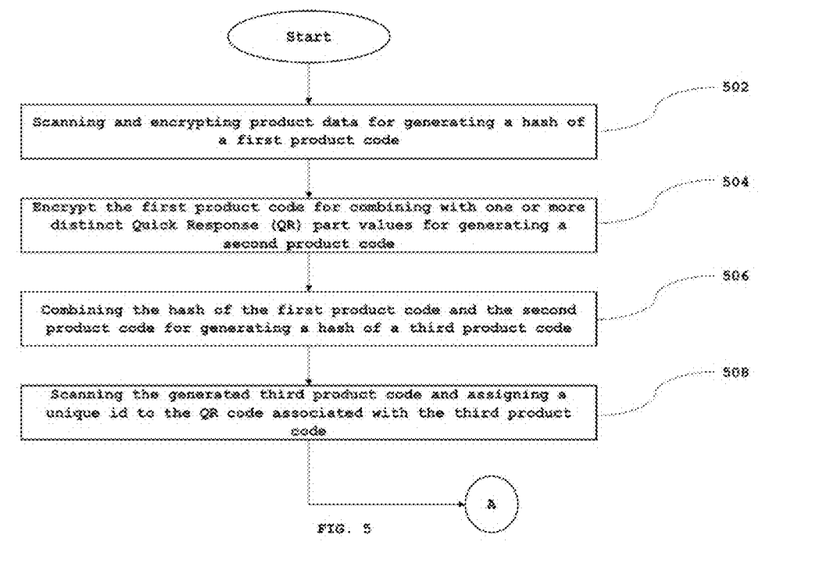
FIG. 5 and FIG. 5A illustrate a flowchart depicting a method for effectively preventing counterfeiting of products using a combination of packaging codes and blockchain technology, in accordance with an embodiment of the present invention.
Figure 5A:
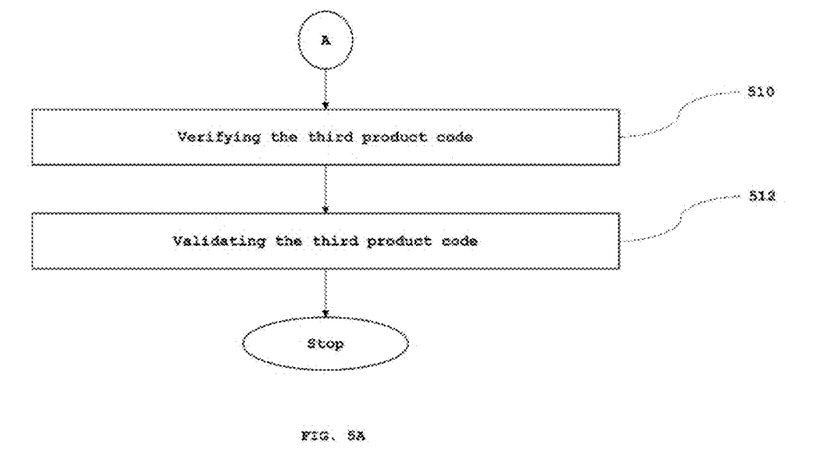

FIG. 5 and FIG. 5A illustrate a flowchart depicting a method for effectively preventing counterfeiting of products using a combination of packaging codes and blockchain technology, in accordance with an embodiment of the present invention.

At step 502, product data is scanned and encrypted for generating a hash of the first product code. In an embodiment of the present invention, product data is received from an input/output unit. The product data is provided by a user (e.g., a manufacturer) via the input/output device. In an example, the product data may include, but is not limited to, a product serial code, a product type, price of the product, stakeholders id, a unique id associated with the product, a product id, a Global Trade Item Number (GTIN) number, a labeler code, a product number, a package code, a serial number, a lot number, a National Drug Code (NDC) number (if the product is a drug) and an expiration date. Further, the product data may include, but is not limited to, address of the stakeholders, current status of product including, shipment status, timestamp, and manufacturing address of product. The product data is updated, if a new product is added when a manufacturer registers and shares the new product data with other stakeholders. Product status is updated when the stakeholder scans and authenticates the product. Also, the product data includes data related to manufacturer, wholesaler, retailer, and pharmacy (if the product is a drug) account address and a contract address generated for the product. In an exemplary embodiment of the present invention, 'n' contract addresses are generated for 'n' stakeholders.

In an embodiment of the present invention, the product data is scanned using a scanning technique such as a QR code scanner or any other scanning application. The product data includes product codes (e.g., product ID, unique ID, etc.) which have been recorded manually by the manufacturer or by employing any scanner. The scanned product data is encrypted for generating a hash of a first product code by employing blockchain technology. The hash of the first product code is represented as a cover_ID hash, which is a cryptographic hash conversion of the product data. The generated hash of the first product code is self-certified on a blockchain network. To self-certify the hash of the first product code on the blockchain network, the encrypted product data associated with the hash of the first product code is written on the blockchain network. A digital sign is embedded in the hash of the first product code and verify the hash of the first product code. The hash of the first product code is verified by firstly decrypting the encrypted product data associated with the hash of the first product code, securing the decrypted product data, and validating the product identity. In an exemplary embodiment of the present invention, a smart contract is created which includes a contract address and a first product code blockchain part value (referred to as a parent block). A smart contract is a transaction protocol that is intended to automatically execute, control, or document events and actions according to the terms of a contract or an agreement. In another exemplary embodiment of the present invention, a chaincode is created. Chaincode is a program, written in at least one of Go® programming language, node.js, or Java® that implements a prescribed interface. Chaincode is executed in a secured Docker® container isolated from a peer process. Chaincode initializes and manages ledger state through transactions submitted by applications. Such as, smart contracts refer to business logic that carries out transactions and access to data and chaincode refers to larger infrastructure of packages and other code that comprises the smart contract. In an exemplary embodiment of the present invention, one product type may include one contract address which is accessible throughout the supply chain by the stakeholders and multiple product types include multiple contract address which are accessible along the blockchain network. Further, a preference between smart contract and chaincode is defined based on respective requirement of blockchain networks such as Ethereum® and Hyperledger®.

At step 504, the first product code is encrypted for combining with one or more distinct Quick Response (QR) part values for generating a second product code. In an embodiment of the present invention, the hash of the first product code is again encrypted for combining with one or more distinct Quick Response (QR) part values for generating a second product code. In an exemplary embodiment of the present invention, other code types such as, numeric, alphanumeric, images, scanning codes, etc. may also be used instead of QR codes. In an embodiment of the present invention, the QR part value divided by 'n' to generate 'n' QR codes part values and combine with the hash of the first product code. The QR part values are assigned to different stakeholders present in the supply chain based on previously captured stakeholders data. As such, if 'n' stakeholders are present, then '64/n' unique QR codes are generated. The start and end characters for QR part values are represented as ((1, 64/n), (64/n+1, 65/2*n), . . . , n). In an embodiment of the present invention, the one or more QR part values may be represented as QR_A, QR_B, QR_C, and QR_D. For example, second product code=(hash of the first product code+QR part value 1)+(hash of the first product code+QR part value 2)+ . . . +(hash of the first product code+QR part value n). The second product code is an 8-to-64 bit code, which is updated and validated by the stakeholder.

At step 506, the hash of the first product code and the second product code are combined for generating a hash of a third product code. In an embodiment of the present invention, the hash of the first product code and the second product code are combined for generating a hash of the third product code referred to as a Cover_ID_AN (alphanumeric) hash. The hash of the third product code is a hash code of 256 bits associated with 'n' stakeholders and may be tagged to a user's ID (e.g., a Worldcoin® identity, digital lock keys, etc.). Start and end character for the hash of the third product code is associated with encrypted data and is represented as (hash of the first product code+second product code (1, 64/n))+(hash of the first product code+second product code (64/n+1, 65/2*n))+ . . . +(hash of the first product code+ second product code (n)). The hash of the third product code is further divided for providing a hash of a first sub-code represented as cover_ID_N hash code (numeric form), which is stuck or printed on a first sticking part and a hash of a second sub-code represented as a cover_ID_A hash code (alphabetical form), which is stuck or printed on a second sticking part on the product, as illustrated in FIG. 2. The numeric form of the hash value is selected based on using one or more types of hash functions, such as, but not limited to, a division method, a mid-square method, a folding method, and a multiplication method. Further, the one or more alphabetical forms of the hash code are selected using a custom hash function that maps one or more keys to the alphabetical forms. The keys are used to divide the hash of the third product code into the hash of the first sub-code and the hash of the second sub-code. Further, the first sub-code and the second sub-code are printed on a scanning pattern for placing on the product, which on combining together fulfills authentication requirement of the parent block in the blockchain network. In an embodiment of the present invention, the third product code is placed on the outer covering or box of the product by using at least snap buttons, rivets, and eyelets, thereby providing a tamper free placement of the third product code, and serialization of packaging of the products. In an embodiment of the present invention, the third product code is printed on the product by encrypting user's address and location co-ordinates, thereby safeguarding the user's address. In another embodiment of the present invention, the third product code is encrypted with payment details for making payment transactions by the users and as such, payment transactions carried out may be tracked between different users. In yet another embodiment of the present invention, the third product code is encrypted with loyalty tags (e.g., reward points, coupons, etc.) which may be scanned for authenticating and releasing rewards. At every level of the supply chain, the scanning pattern provides product data when a scanning operation is performed. As such, no other stakeholder can breach or determine the third product code associated with another stakeholder. In the event, any person tries to tamper with the third product code, then the authentication breaks and a notification alerting regarding the tampering is sent to the parent block of the blockchain network.

At step 508, the generated third product code is scanned and a unique id is assigned to the QR code associated with the third product code. In an embodiment of the present invention, the generated third product code is scanned using a scanning technique. The scanning technique may include a scanning application, such as, Android® application, web application or Windows® application. Subsequent to scanning, a unique id assigned to the QR code associated with the third product code is fetched from a server (not shown) by using a QR code Application Programming Interface (API). The QR code API communicates with a Hyperledger® network API on the blockchain network and the product details (e.g., product name, product type, delivery destination, and delivery source) are fetched for displaying on a screen at the input/output unit. Subsequently, a request from blockchain network is redirected to the chaincode. A comparison of the scanned third product code placed on the product is performed with the requested user ID, the generated hash of the first product code, the second product code and the hash of the third product code to ascertain a match therebetween for preventing counterfeiting of the product. In the event, it is determined that the scanned third product code matches with a requested user ID, the hash of the first product code, the second product code and the hash of the third product code (which is a combination of the hash of the first product code, and the second product code), then the request is verified by a middleware API service. In the event, it is determined that the scanned third product code does not match with the requested user ID, the hash of the first product code, the second product code and the hash of the third product code, then the request is rejected by the middleware API service end.

At step 510, the third product code is verified. In an embodiment of the present invention, subsequent to successful verification of the request, a notification is sent to the input/output unit for providing the product data related updates in the form of a message or an email. Similarly, the third product code is verified for all the products associated with all the stakeholders present in the supply chain. In an exemplary embodiment of the present invention, the product is considered to be legitimate, if the third product code is correctly verified, otherwise the product is considered to be illegitimate.

At step 512, the third product code is validated. In an embodiment of the present invention, the third product code placed on the product is further scanned by using the scanning technique. A unique Universal Resource Locator (URL) link associated with a product status update request is rendered on the input/output unit, subsequent to scanning of the third product code, for updating status of the product. In an embodiment of the present invention, a Representational State Transfer Application Programming Interface (REST API) server receives the product status update request along with a stakeholder account address. The blockchain network is unlocked by using the stakeholder's account address and an associated password and a final verification process by using stakeholders consortium data. In the event, the blockchain network is unlocked successfully, then a third product code validation request is sent to the blockchain network. In an embodiment of the present invention, a check is carried out to determine whether a contract address associated with the third product code exists or not in the blockchain network. In the event, the contract address associated with the third product code exists in the blockchain network, then a contract address status is updated and validated by reading the actual contract address and fetching the stakeholder's current account address from the blockchain network. In the event, the contract address associated with the third product code does not exist in the blockchain network, then the product status update request is rejected and sent back to the stakeholder.

In another embodiment of the present invention, if the contract address associated with the third product code exists in the blockchain network, then the validated status of the contract address associated with the third product code is communicated to a second product code contract validation process for a live update.

In an embodiment of the present invention, a three-step check is carried out to validate status of the second product code contract. Firstly, a check is performed to determine whether a contract address associated with the second product code exists or not in the blockchain network. Secondly, a check is performed to determine whether the contract belongs to the same stakeholder or not. Thirdly, a check is carried out to determine whether the 16-bit second product code stored in the blockchain matches with the 16-bit actual contract address associated with the second product code. The contract address may vary from 64 bit to 256 bit. In the event, all the three checks are successful, then the status of the contract address associated with the second product code is updated and validated on the blockchain network by reading the actual contract address and fetching the stakeholder's current account address from the blockchain network. Further, status from the validated second product code along with the actual contract address and stakeholder's current address is communicated to a new product contract for live update, and status of a new product is updated on the blockchain network based on the timestamp. Further, latest status of the new product is communicated to the stakeholders via the input/output unit. In the event, the first and second checks are unsuccessful, then the product status update request is rejected and sent back to the stakeholder. Further, in the event the third check is unsuccessful, then a breach is determined, and the status of the contract address associated with the second product code is updated and validated on the blockchain network by reading the actual contract address and fetching the stakeholder's current account address from the blockchain network.

Advantageously, in accordance with various embodiments of the present invention, the present invention provides for effectively preventing counterfeiting of products using a triple level of encryption and a four level of decryption on a blockchain network for universal serial numbers. The present invention provides for generating scanning patterns that hold different data associated with the product for each stakeholder's authentication, thereby providing individual verification of product data at each stage of supply chain. The present invention provides for generating the hash of the third product code which has different combinations of chaincode that is only stored on an immutable blockchain network, and therefore it is not feasible to tamper with. The present invention provides for generating the product codes that can be scanned using normal scanning device, thereby reducing infrastructure setup cost. Further, the present invention, provides for using the third product code for multiple industries (such as, retail, automobile, etc.), multiple types of scanning codes, multiple variants of serial numbers, multiple level of packaging, multiple level of supply chain, multiple stakeholders. Further, the present invention provides for synchronizing the third product code with any form of scanning code associated with different industry having different type of predefined serial number and providing representation for different countries, region, category, or types. Furthermore, the present invention provides for generating cost effective product codes to prevent counterfeiting of products. Yet further, the present invention provides for verifying product codes at each and every stage of the supply chain.

Figure 6:
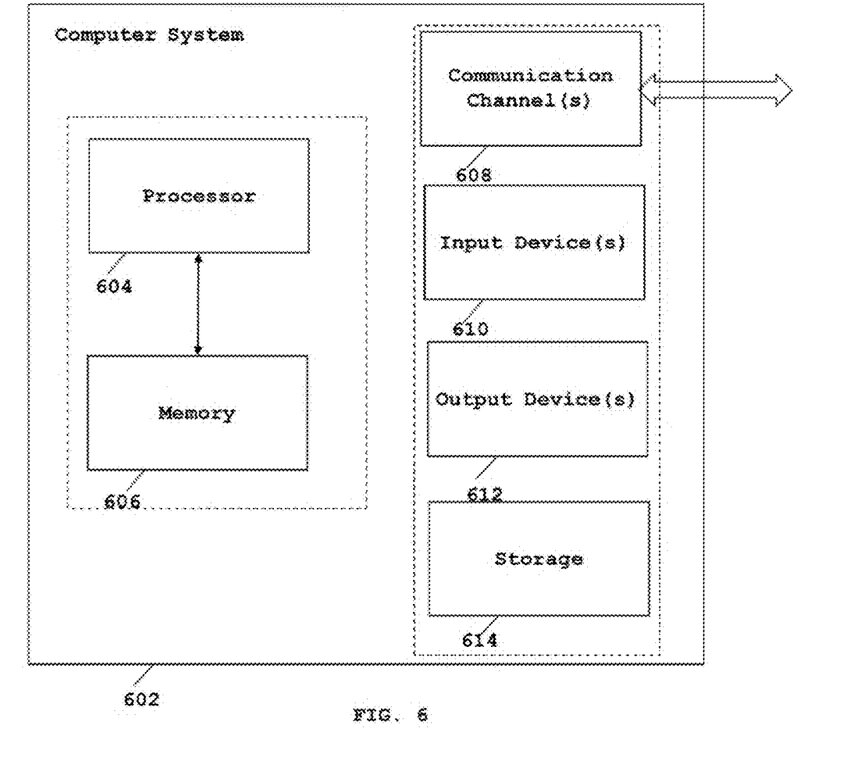
FIG. 6 illustrates an exemplary computer system in which various embodiments of the present invention may be implemented.

FIG. 6 illustrates an exemplary computer system 602 in which various embodiments of the present invention may be implemented. The computer system 602 comprises a processor 604 and a memory 606. The processor 604 executes program instructions and is a real processor. The computer system 602 is not intended to suggest any limitation as to scope of use or functionality of described embodiments. For example, the computer system 602 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 606 may store software for implementing various embodiments of the present invention. The computer system 602 may have additional components. For example, the computer system 602 includes one or more communication channels 608, one or more input devices 610, one or more output devices 612, and storage 614. An interconnection mechanism (not shown) such as a bus, controller, or network, interconnects the components of the computer system 602. In various embodiments of the present invention, operating system software (not shown) provides an operating environment for various softwares executing in the computer system 602 and manages different functionalities of the components of the computer system 602.

The communication channel(s) 608 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth, or other transmission media.

The input device(s) 610 may include, but not limited to, a keyboard, mouse, pen, joystick, trackball, a voice device, a scanning device, touch screen or any another device that is capable of providing input to the computer system 602. In an embodiment of the present invention, the input device(s) 610 may be a sound card or similar device that accepts audio input in analog or digital form. The output device(s) 612 may include, but not limited to, a user interface on CRT or LCD, printer, speaker, CD/DVD writer, or any other device that provides output from the computer system 602.

The storage 614 may include, but not limited to, magnetic disks, magnetic tapes, CD-ROMs, CD-RWs, DVDs, flash drives or any other medium which can be used to store information and can be accessed by the computer system 602. In various embodiments of the present invention, the storage 614 contains program instructions for implementing the described embodiments.

The present invention may suitably be embodied as a computer program product for use with the computer system 602. The method described herein is typically implemented as a computer program product, comprising a set of program instructions which is executed by the computer system 602 or any other similar device. The set of program instructions may be a series of computer readable codes stored on a tangible medium, such as a computer readable storage medium (storage 614), for example, diskette, CD-ROM, ROM, flash drives or hard disk, or transmittable to the computer system 602, via a modem or other interface device, over either a tangible medium, including but not limited to optical or analogue communications channel(s) 608. The implementation of the invention as a computer program product may be in an intangible form using wireless techniques, including, but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

I claim:

1. A system for generating a unique product code by employing a combination of packaging codes and blockchain technology, the system comprising:
   a memory storing program instructions;
   a processor executing instructions stored in a memory; and
   a product code generation engine executed by the processor and configured to:
   generate a hash of a first product code, by encrypting scanned product data associated with a product received from an input/output unit, wherein the hash of the first product code is a cryptographic hash conversion of the product data;
   generate a second product code by encrypting the first product code and combining the encrypted first product code with one or more distinct Quick Response (QR) part values;
   generate a hash of a third product code by combining the hash of the first product code and the second product code, wherein the hash of the third product code is divided into a hash of a first sub-code and a hash of a second sub-code; and
   perform a comparison of a scanned third product code placed on the product with a requested user ID, the generated hash of the first product code, the second product code and the hash of the third product code to ascertain a match therebetween for generating the unique product code, wherein the hash of the third product code comprising the hash of the first sub-code is in a numeric form and is deployed on a first sticking part and the hash of the second sub-code is an alphabetical form deployed on a second sticking part by using snap buttons, rivets, and eyelets on an outer covering or a box of the product for providing a tamper free placement of the third product code and serialization of packaging of the products.

2. The system as claimed in claim 1, wherein the product code generation engine comprises a first product code generation unit executed by the processor and configured to self-certify the hash of the first product code on the blockchain network by writing the encrypted scanned product data on the blockchain network, and wherein the hash of the first product code generation unit embeds a digital sign in the hash of the first product code.

3. The system as claimed in claim 1, wherein the hash of the first product code is verified by the hash of the first product code generation unit by decrypting the encrypted product data associated with the hash of the first product code, securing the decrypted product data, and validating the product identity.

4. The system as claimed in claim 3, wherein the first product code generation unit creates a smart contract which includes a contract address and a first product code blockchain part value, and wherein one product type includes one contract address which is accessible throughout the supply chain by the stakeholders and multiple product types include multiple contract addresses which are accessible along the blockchain network.

5. The system as claimed in claim 1, wherein the product code generation engine comprises a second product code generation unit executed by the processor and configured to divide the QR part values by 'n' to generate 'n' QR codes part values and combine with the hash of the first product code, and wherein the QR part values are assigned to different stakeholders present in the supply chain based on previously captured stakeholders data.

6. The system as claimed in claim 1, wherein the hash of the third product code is a hash code of 256 bits associated with 'n' stakeholders and may be tagged to a user's ID.

7. The system as claimed in claim 1, wherein the third product code is printed on the product by encrypting user's address and location co-ordinates, and wherein the third product code is encrypted with payment details for making payment transactions which are tracked between different users, and wherein the third product code is encrypted with loyalty tags which are scanned for authenticating and releasing rewards, and wherein at every level of the supply chain the scanning pattern provides product data when a scanning operation is performed, and wherein in the event any person tries to tamper with the third product code, then the authentication breaks and a notification alerting regarding the tampering is sent to a parent block of the blockchain network.

8. The system as claimed in claim 1, wherein the product code generation engine comprises a product code scanning unit executed by the processor and is configured to scan the third product code using a scanning technique, and subsequent to scanning, a unique id assigned to the QR code associated with the third product code is fetched from a server by using a QR code Application Programming Interface (API), and wherein QR code API communicates with a Hyperledger® network API on the blockchain network and the product details are fetched for displaying on a screen at the input/output unit.

9. The system as claimed in claim 8, wherein in the event it is determined by the product code scanning unit that the scanned third product code matches with the requested user ID, the hash of the first product code, the second product code and the hash of the third product code, then the request is verified by a middleware API service, and wherein if it is determined that the scanned third product code does not match with the requested user ID, the hash of the first product code, the second product code and the hash of the third product code, then the request is rejected by the middleware API service end.

10. The system as claimed in claim 9, wherein the product code scanning unit, subsequent to successful verification of the request, sends a notification to the input/output unit for providing the product data related updates in the form of a message or an email, and wherein the third product code is verified for all the products associated with all the stakeholders present in the supply chain, and wherein the product is considered to be legitimate if the third product code is correctly verified.

11. The system as claimed in claim 1, wherein the product code generation engine comprises a product code validation unit executed by the processor and configured to render a unique Universal Resource Locator (URL) link associated with a product status update request on the input/output unit subsequent to scanning of the third product code for updating status of the product, and wherein a Representational State Transfer Application Programming Interface (REST API) server associated with the engine is configured to receive the product status update request along with a stakeholder account address, and wherein the blockchain network is unlocked by using the stakeholder's account address and an associated password and a final verification process based on stakeholders consortium data.

12. The system as claimed in claim 4, wherein the product code validation unit sends a third product code validation request to the blockchain network in the event the blockchain network is unlocked successfully, and wherein in the event it is determined that the contract address associated with the third product code exists in the blockchain network then a contract address status is updated and validated by reading the actual contract address and fetching the stakeholder's current account address from the blockchain network.

13. The system as claimed in claim 12, wherein the product code validation unit rejects the product status update request and sent back to the stakeholder in the event it is determined that the contract address associated with the third product code does not exist in the blockchain network, and wherein if the contract address associated with the third product code exists in the blockchain network then the validated status of the contract address associated with the third product code is communicated to a second product code contract validation process for a live update.

14. The system as claimed in claim 13, wherein status of the second product code contract is validated by the product code validation unit by firstly, performing a check to determine whether a contract address associated with the second product code exists in the blockchain network; secondly, a check is performed to determine whether the contract belongs to the same stakeholder or not; and thirdly, a check is carried out to determine whether the 16 bit second product code stored in the blockchain matches with the 16 bit actual contract address associated with the second product code.

15. The system as claimed in claim 14, wherein status from the validated second product code along with the actual contract address and stakeholder's current address is communicated to a new product contract for live update, and status of a new product is updated on the blockchain network based on the timestamp.

16. The system as claimed in claim 15, wherein in the event all the three checks are successful, then the status of the contract address associated with the second product code is updated and validated by the product code validation unit on the blockchain network by reading the actual contract address and fetching the stakeholder's current account address from the blockchain network, and wherein in the event the first and second checks are unsuccessful then the product status update request is rejected and sent back to the stakeholder, and wherein in the event the third check is unsuccessful then a breach is determined and the status of the contract address associated with the second product code is updated and validated on the blockchain network by reading an actual contract address and fetching the stakeholder's current account address from the blockchain network.

17. A method for generating a unique product code by employing a combination of packaging codes and blockchain technology, the method is implemented by a processor executing instructions stored in a memory, the method comprises:
generating a hash of a first product code by encrypting scanned product data associated with a product received from an input/output unit, wherein the hash of the first product code is a cryptographic hash conversion of the product data;
generating a second product code by encrypting the first product code and combining the encrypted first product code with one or more distinct Quick Response (QR) part values;
generating a hash of a third product code by combining the hash of the first product code and the second product code, wherein the hash of the third product code is divided for providing a hash of a first sub-code and a hash of a second sub-code; and
performing a comparison of a scanned third product code placed on the product with a requested user ID, the generated hash of the first product code, the second product code and the hash of the third product code to ascertain a match therebetween for generating the unique product code, wherein the hash of the third product code comprising the hash of the first sub-code is in a numeric form and is deployed on a first sticking part and the second sub-code is an alphabetical form and is deployed on a second sticking part by using snap buttons, rivets, and eyelets on an outer covering or box of the product for providing a tamper free placement of the third product code and serialization of packaging of the products.

18. The method as claimed in claim 17, wherein the generated hash of the first product code is self-certified on a blockchain network by writing the encrypted product data associated with the hash of the first product code on the blockchain network, and wherein a digital sign is embedded in the hash of the first product code.

19. The method as claimed in claim 17, wherein the hash of the first product code is verified by decrypting the encrypted product data associated, securing the decrypted product data, and validating the product identity, and wherein a smart contract is created which includes a contract address and a first product code blockchain part value, and wherein one product type includes one contract address which is accessible throughout the supply chain by the stakeholders and multiple product types include multiple contract addresses which are accessible along the blockchain network.

20. The method as claimed in claim 17, wherein the QR part values are divided by 'n' to generate 'n' QR codes part values and combines with the hash of the first product code, and wherein the QR part values are assigned to different stakeholders present in the supply chain based on previously captured stakeholders data.

21. The method as claimed in claim 17, wherein the third product code is printed on the product by encrypting user's address and location co-ordinates, and wherein the third product code is encrypted with payment details for making payment transactions which are tracked between different users, and wherein the third product code is encrypted with loyalty tags which are scanned for authenticating and releasing rewards, and wherein at every level of the supply chain the scanning pattern provides the product data when a scanning operation is performed, and wherein in the event any person tries to tamper with the third product code then the authentication breaks and a notification alerting regarding the tampering is sent to a parent block of the blockchain network.

22. The method as claimed in claim 19, wherein the third product code is scanned using a scanning technique, and subsequent to scanning, a unique id assigned to the QR code associated with the third product code is fetched from a server by using a QR code Application Programming Interface (API), and wherein QR code API communicates with a Hyperledger® network API on the blockchain network and the product details are fetched for display.

23. The method as claimed in claim 22, wherein in the event it is determined that the scanned third product code matches with the requested user ID, the hash of the first product code, the second product code and the hash of the third product code, then the request is verified by a middleware API service, and wherein it is determined that the scanned third product code does not match with the requested user ID, the hash of the first product code, the second product code and the hash of the third product code, then the request is rejected by the middleware API service end.

24. The method as claimed in claim 23, wherein subsequent to successful verification of the request, a notification is sent for providing the product data related updates in the form of a message or an email, and wherein the third product code is verified for all the products associated with all the stakeholders present in the supply chain, and wherein the product is considered to be legitimate if the third product code is correctly verified.

25. The method as claimed in claim 17, wherein a unique Universal Resource Locator (URL) link associated with a product status update request is rendered subsequent to scanning of the third product code for updating status of the product, and wherein a Representational State Transfer Application Programming Interface (REST API) server is configured to receive the product status update request along with a stakeholder account address, and wherein the blockchain network is unlocked by using the stakeholder's account address and an associated password and a final verification process by using stakeholders consortium data.

26. The method as claimed in claim 19, wherein in the event the blockchain network is unlocked successfully a third product code validation request is sent to the blockchain network, and wherein in the event it is determined that the contract address associated with the third product code exists in the blockchain network a contract address status is updated and validated by reading the actual contract address and fetching the stakeholder's current account address from the blockchain network.

27. The method as claimed in claim 26, wherein in the event the contract address associated with the third product code does not exist in the blockchain network, then the product status update request is rejected and sent back to the stakeholder, and wherein if the contract address associated with the third product code exists in the blockchain network then the validated status of the contract address associated with the third product code is communicated to a second product code contract validation process for a live update.

28. The method as claimed in claim 27, wherein status of the second product code contract is validated by firstly, performing a check to determine whether a contract address associated with the second product code exists or not in the blockchain network; secondly, a check is performed to determine whether the contract belongs to the same stakeholder or not; and thirdly, a check is carried out to determine whether the 16 bit second product code stored in the blockchain matches with the 16 bit actual contract address associated with the second product code, and wherein status from the validated second product code along with the actual contract address and stakeholder's current address is communicated to a new product contract for live update, and status of a new product is updated on the blockchain network based on the timestamp.

29. The method as claimed in claim 28, wherein in the event it is determined that all the three checks are successful, then the status of the contract address associated with the second product code is updated and validated on the blockchain network by reading the actual contract address and fetching the stakeholder's current account address from the blockchain network, and wherein in the event, the first and second checks are unsuccessful, then the product status update request is rejected and sent back to the stakeholder, and wherein in the event it is determined that the third check is unsuccessful, then a breach is determined and the status of the contract address associated with the second product code is updated and validated on the blockchain network by reading an actual contract address and fetching the stakeholder's current account address from the blockchain network.

30. A computer program product comprising:
a non-transitory computer-readable medium having computer program code stored thereon, the computer-readable program code comprising instructions that, when executed by a processor, causes the processor to:
generate a hash of a first product code by encrypting scanned product data associated with a product received from an input/output unit, wherein the hash of the first product code is a cryptographic hash conversion of the product data;
generate a second product code by encrypting the first product code for combining the encrypted first product code with one or more distinct Quick Response (QR) part values;
generate a hash of a third product code by combining the hash of the first product code and the second product code, wherein the hash of the third product code is divided into a hash of a first sub-code and a hash of a second sub-code; and
perform a comparison of a scanned third product code placed on the product with a requested user ID, the generated hash of the first product code, the second product code and the hash of the third product code to ascertain a match therebetween for generating the unique product code, wherein the hash of the third product code comprising the hash of the first sub-code is in a numeric form and is deployed on a first sticking part and the second sub-code is an alphabetical form and is deployed on a second sticking part by using snap buttons, rivets, and eyelets on an outer covering or box of the product for providing a tamper free placement of the third product code and serialization of packaging of the products.

* * * * *